United States Patent Office 2,721,563
Patented Oct. 25, 1955

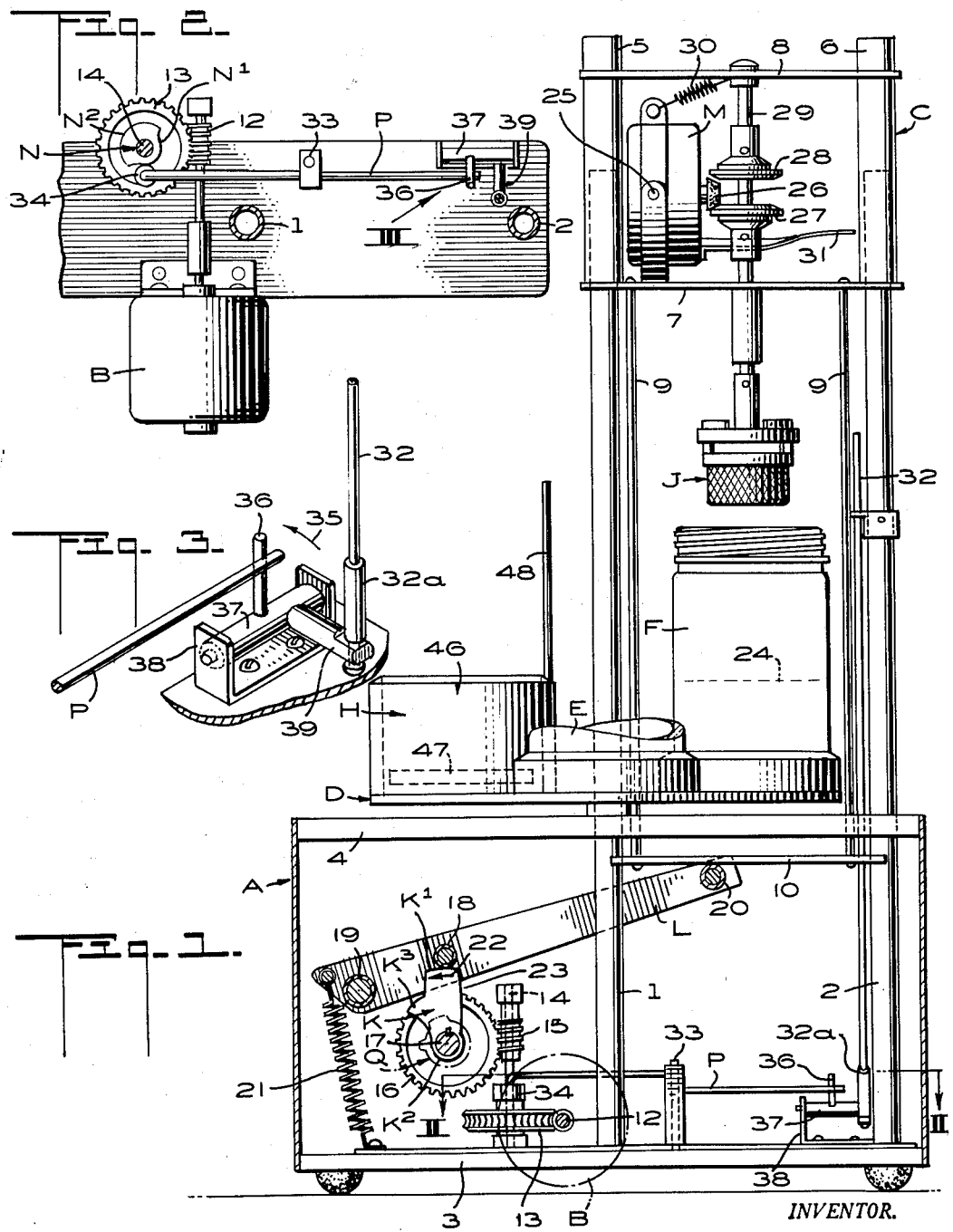

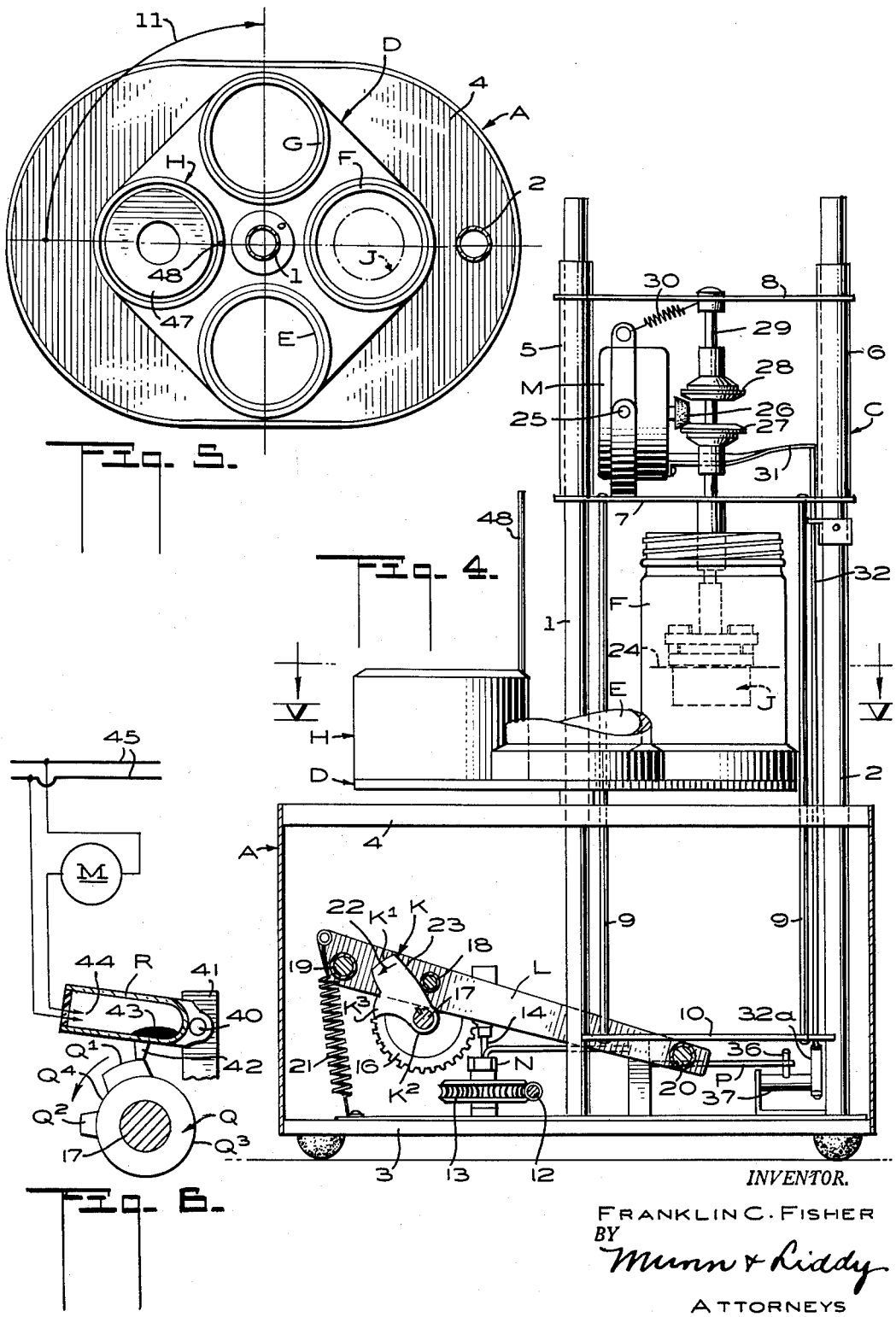

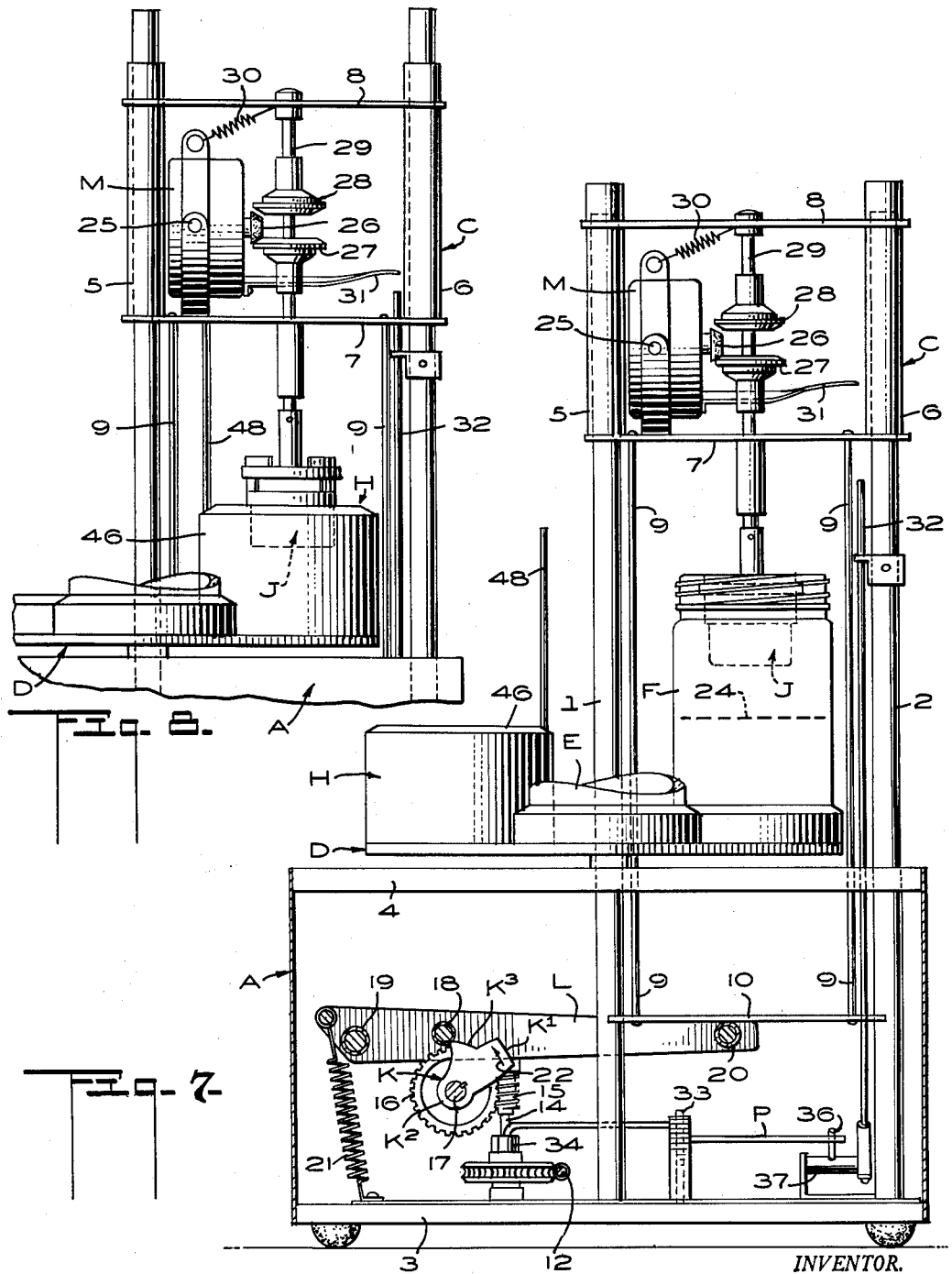

2,721,563

MACHINE FOR WASHING WATCH PARTS

Franklin C. Fisher, San Francisco, Calif.

Application June 22, 1953, Serial No. 363,057

4 Claims. (Cl. 134—61)

An object of my invention is to provide an improvement over the machine for washing watch parts disclosed in my Patent No. 2,645,236, issued July 14, 1953, of which this case is a continuation-in-part. In my patent the machine has a basket for containing the parts to be washed and dried and mechanism is provided for lowering the basket progressively into each one of three jars or containers that are mounted on a turntable. The first container carries a cleaning fluid while the next two carry rinsing fluids. In each container or jar, the basket is initially lowered into the fluid and is rotated for a period of time and then is raised above the fluid and stopped in its rotation so as to permit the fluid to come to rest. This operation is repeated a number of times and then the basket is raised to a point above the fluid and is rotated rapidly, while still in the container for throwing off the excess fluid.

At the end of the spinning operation, the basket is raised to a point above the jar or container and then automatic means is provided for rotating the turntable 90° for bringing the next jar into a position where the basket can be lowered into it for rinsing the parts that have been washed. The same operation for the basket is carried out in the rinsing jar as is accomplished in the washing jar and then the basket is raised clear of the rinsing jar and the turntable is rotated to bring the second rinsing jar into a basket-receiving position. Again the basket goes through its same cycle of operations in the second rinsing jar as it did in the washing and first rinsing jars.

After the parts in the basket have been given their second rinsing and rapid spinning, the basket is raised above the jar top and a heater, also mounted on the turntable, is brought into a position where the warm air from the heater will dry the parts completely when the basket is lowered into the heater and rotated. This completes the operation and the machine will automatically shut off.

The present machine makes use of many parts that are disclosed in my patent and these will be referred to in the description. I found that the use of one motor for operating all of the mechanism disclosed in my patent, placed too great a strain upon it, and I have therefore provided an additional motor for operating the basket rotating mechanism and in this respect the present invention differs from the patented one.

The turntable rotating means for bringing successively the cleaning jar and the two rinsing jars, as well as the heating member into a position adjacent to the basket, is the same as in my patent and therefore this mechanism is not illustrated again in this case. The turntable rotating means of the patent becomes a part of the present machine for washing watch parts.

I have found that if the basket is alternately rotated first in one direction and then in the other, while the basket remains in the fluid, a better washing operation results over that shown in my patent where the basket is rotated in one direction for a period of time and then the basket is stopped in its rotation and is raised out of the fluid and held there until the fluid comes to rest, whereupon the operation is repeated. In the present continuation-in-part case the basket is rotated in one direction just long enough to cause the fluid to surge through the basket to clean or rinse the parts. As soon, however, as the fluid in the container tends to rotate with the basket and to form an air space within and around the basket due to this rotation, I stop further rotation of the basket in one direction and cause it to immediately rotate in the opposite direction for a like interval of time. The result is that a thorough washing and rinsing of the parts in the basket is accomplished without the forming of an air space around the parts which would prevent the fluid from washing over or rinsing these parts.

I am aware of reversible motors being used for rotating the basket first in one direction and then in the other. These motors, however, are of the commutator type and when they are reversed in their movement, sparks are likely to be generated. The fluid used in the cleaning and rinsing of the parts is volatile and explosive and any sparks generated by a motor would likely cause an explosion of this volatile liquid to occur. I overcome this disadvantage by providing a motor which will rotate in one direction so long as it is operating and then I provide novel reversing means for connecting this motor with the basket so that, although the motor is rotating in one direction, the basket will be alternately rotated first in one direction and then in the opposite direction.

I have found that a better watch washing machine results if one motor is used for operating all parts of the machine, with the exception of the basket, and a second motor is used for rotating the basket. The reversing means that connects the basket motor with the basket also includes novel means for causing the motor to rotate the basket in one direction only during the spinning operation within each container for throwing off excess liquid. This same means is operative when the basket is brought adjacent to the heating unit so that the basket will be rotated in only one direction during the time the parts are subjected to heat for drying them.

Other objects and advantages will appear in the following specification, and the novel features of the device will be particularly pointed out in the appended claims.

My invention is illustrated in the accompanying drawings forming a part of this application, in which:

Figure 1 is a front elevation of the device with parts shown in section and the basket illustrated in a raised position above the top of the container so that the turntable carrying the containers can be rotated 90° for bringing another container into a position to receive the basket;

Figure 2 is a horizontal section taken along the line II—II of Figure 1;

Figure 3 is an isometric view when looking in the direction of the arrow III of Figure 2;

Figure 4 is a view similar to Figure 1, but shows the parts in a wash or rinse position with the basket submerged in the liquid carried by the container;

Figure 5 is a horizontal section taken along the line V—V of Figure 4;

Figure 6 is a schematic view of the mercury switch mechanism which connects the motor rotating basket with a source of current during certain periods of the operation of the machine;

Figure 7 is a view similar to Figures 1 and 4 and illustrates the basket in spinning position within the container and above the fluid for throwing off any liquid on the parts, by centrifugal force; and Figure 8 is a view of the upper portion of Figure 7 and illustrates the basket positioned in the heater for drying the parts in the basket.

While I have shown only the preferred form of my invention, it should be understood that various changes or modifications may be made within the scope of the appended claims without departing from the spirit and scope of the invention.

In carrying out my invention, I provide a casing indicated generally at A and this casing houses a motor B, see Figure 2. The mechanism for raising and lowering a basket-carrying frame C is operated by the motor. Before describing the mechanism for raising and lowering the frame C, it is best to set forth the structure on which the frame C is mounted. This structure comprises two tubular uprights 1 and 2 that extend from the base 3 of the casing, up through the top 4 of the same casing and the portions of the uprights that extend above the top 4 are designed to slidably receive sleeves 5 and 6 that form the sides of the basket-carrying frame C.

Figure 1 illustrates that the sleeves 5 and 6 are slidably mounted on the tubular uprights 1 and 2, respectively, and that the lower ends of the sleeves are interconnected by a lower cross bar 7, while the upper ends are interconnected by an upper cross bar 8. The lower cross bar 7 is supported by a pair of rods 9 and the lower ends of the rods are connected to a cross head 10 that is also guided by the tubular uprights 1 and 2. Figure 1 shows the lower ends of the rods 9 extending into the casing A so that the cross head 10 will actually be mounted within the casing.

In Figure 5 I show the top 4 of the casing A in plan view and the portions of the tubular uprights 1 and 2 that project above the top 4 are shown in section. A turntable indicated generally at D is mounted above the top 4 and is rotatable about the tubular upright 1. The turntable carries a wash jar E, a first rinse jar F, a second rinse jar G and a heater H. The three jars or containers and the heater are spaced 90° apart, one from the other.

The turntable D is rotated intermittently by the mechanism shown in my Patent No. 2,645,236 and for each rotation, the table is moved through an arc of 90° as indicated by the arcuate arrow 11, in Figure 5. At the start of the cleaning operation, the wash jar E will be disposed between the two tubular uprights 1 and 2 in a position where a basket J can be moved down into the jar. After the washing operation the basket J is raised above the top of the jar by a mechanism hereinafter described and then the turntable D is rotated through an arc of 90° to bring the first rinse jar F into the position shown in Figure 5. When the basket completes its cycle of operation in the first rinse jar, it is raised above the top of the jar and then the turntable is rotated through another arc of 90° to bring the second rinse jar G into a position between the tubular uprights 1 and 2.

The same series of operations by the basket J is carried out in the second rinsing jar G and then the basket is raised above the top of this jar and the heater H is brought into a position between the tubular uprights 1 and 2, by the turntable D rotating through another arc of 90°. The basket J with its parts is rotated in the heater and the parts will be dried. This completes the operation of washing, double rinsing and drying, and the cleaned and dried parts can be removed from the basket.

It is best at this point to describe the movement of the basket-carrying frame C. In Figures 1 and 2, I show the motor B rotating a worm 12. This worm meshes with a worm gear 13 that is mounted on a vertical shaft 14, see Figure 2. In Figure 1 the shaft 14 is shown provided with a second worm 15 and this worm meshes with a second worm gear 16. The worm gear 16 in turn is keyed to a main shaft 17 and this shaft carries a cam K of the shape shown in Figures 1, 4 and 7.

When the basket J is in the raised position above the top of one of the jars, the high point K1 of the cam K will be supporting a roller 18 that is mounted on a lever L, see Figure 1. The lever L is pivoted on a shaft 19 and the long arm of the lever carries a roller 20 that rides along the under surface of the cross head 10. Springs 21 are connected to the base 3 and to the short arm of the lever L in order to counterbalance the weight of the basket-carrying frame C and the mechanism supported by the frame.

The length of the arcuate high point K1 on the cam K is sufficient to support the basket J at a point above the top of the jar until the turntable D is rotated through an arc of 90° to bring the next jar into position. The table could be rotated by hand, but the device operates better automatically so as to carry through the rotation of the turntable at the proper time. None of the turntable rotating means is illustrated because it is the same as disclosed in my patent above mentioned.

The cam K rotates in a counter-clockwise direction as indicated by the arrow 22 in Figure 1. The cam has a low arcuate portion K2 that comes into position to receive the roller 18 as the cam rotates counter-clockwise and the roller rides down the substantially radially extending edge portion 23 of the cam. In Figure 4 the roller 18 is actually illustrated as moving down the edge portion 23. This will permit the basket-carrying frame C to lower and to move the basket J into its lowermost position within the jar. The basket J will remain within the jar and immersed in the liquid 24 so long as the roller 18 continues to ride on the low arcuate cam portion K2.

Before describing the remainder of the cycle carried out by the cam K in a single rotation through 360° of the cam, it would be well to set forth how the basket J is alternately rotated in opposite directions while the basket remains submerged in the wash or rinse liquid. A second motor M is mounted within the basket-carrying frame C and is pivotally supported at 25 so that the motor can be rocked about a horizontal axis. The motor shaft carries a cone-shaped friction member 26 that is positioned between two larger cone-shaped members 27 and 28. The cones 27 and 28 are spaced from each other and are keyed to a vertical shaft 29 that in turn is rotatably carried by the basket-carrying frame C. A light coil spring 30 exerts a pull on the motor to swing it about the horizontal pivots 25 and to yieldingly hold the cone 26 in contact with the lower large cone 27. The shaft 29 extends below the lower cross bar 7 of the basket-carrying frame C and removably supports the basket J. The shaft 29 is long enough to cause the basket J to be immersed in the fluid 24 when the basket-carrying frame C is lowered to a point where the roller 19 will ride on the arcuate cam portion K2.

Figure 1 shows an arm 31 extending from the face of the motor M and the free end of the arm is adapted to be contacted by the top of a reciprocable rod 32 when the frame C is in its lowest position so as to immerse the basket J in the fluid. The means for reciprocating the rod 32 is illustrated in Figures 1 to 3, inclusive. The vertical shaft 14 that carries the worm gear 13 and the worm 15, also carries a cam N. This cam has an arcuate portion N1 disposed close to the shaft 14 and a second arcuate portion N2 disposed a greater distance from the same shaft. In Figure 2, I illustrate a lever P that is pivoted on a vertical stub shaft 33 that in turn is supported by the base 3. A cam following roller 34 is rotatably carried by the left-hand end of the lever P and rotates about a vertical axis so as to ride on either the arcuate cam portion N1 or N2 of the cam N. The right-hand end of the lever P in Figure 2 is illustrated in Figure 3 and when this end is moved in the direction of the arrow 35 in Figure 3, it will strike against a vertically-extending arm 36 that projects upwardly from a rockable member 37. Figure 1 shows the member 37 rotatably mounted in a bracket 38 that in turn is supported by the base 3.

The rockable member 37 carries a horizontally-extending arm 39 and the lower end of the reciprocable rod 32 has an enlarged portion 32a that rides on the horizontal arm 39. The rod 32 extends through an opening provided in the horizontal arm 39 so that the rod will remain connected to the arm as the latter is swung in a vertical plane.

It will be apparent from the construction just set forth that a continuous rotation of the cam N will cause a continuous rocking of the lever P about the pivot 33 and this through the arms 36 and 39 on the rockable member 37 will cause the rod 32 to reciprocate vertically so long as the motor B operates. When the basket-carrying frame C is in its uppermost position, as shown in Figure 1, the arm 31 for the motor M will be disposed a considerable distance above the top of the reciprocating vertical rod 32 and therefore the arm 31 will not be moved by the rod and the cone member 26 will remain in contact with the lower large cone 27 continuously. It so happens that when the frame C is in its uppermost position, the motor M will be cut off from its source of current and therefore the basket will not be rotated. This will be described more in detail hereinafter.

When, however, the frame C is lowered so as to move the basket into the fluid 24, the arm 31 rigidly connected to the motor M will contact with the top of the reciprocating rod 32 and the rod will swing the arm and rock the motor about its horizontal pivots 25. This will move the cone member 26 from the large lower cone 27 to the large upper cone 28 and vice versa, with the result that the basket J will be rotated in one direction for a number of turns and then will be rotated in the opposite direction for a like number of turns.

It is best to refer to Figure 6 at this point to show that when the basket J is submerged in the liquid 24, the motor M will be connected to a source of current. This is accomplished by mounting a cam Q on the main cam shaft 17, see Figure 6, and this cam has two high points Q1 and Q2, and two low points Q3 and Q4. A mercury switch R is pivoted at 40 on a supporting member 41 that is mounted within the casing A. The switch carries a projection or foot 42 that is illustrated in Figure 6 as riding on the high point Q1 of the cam Q. This will incline the mercury switch R so as to move a ball of mercury 43 away from contact terminals 44 extending into the tube, and therefore the motor will be disconnected from the source of current indicated by the wires 45. The foot or projection 42 when riding on the high point Q1 of the cam will keep the motor disconnected from the source of current while the turntable D is swung through an arc of 90°. When this is completed, the portion Q1 of the cam will move away from the foot 42 and permit the foot to ride on the low portion Q3 of the cam. The ball of mercury 43 will roll to the other end of the tube R and close the contacts 44 for connecting the motor to a source of current. The motor M will now rotate continuously while the basket J is submerged in the fluid 24.

During this rotation of the motor, the reciprocating rod 32 will alternately raise and lower the arm 31 and cause the motor M to move the cone 26 to contact either the large cone 27 or the large cone 28 and rotate the basket alternately in opposite directions. For the present machine the number of alternations is about seventy while the basket remains in the fluid, although I do not wish to be confined to any exact number of alternations.

It is best now to refer back to the cam K which revolves at the same speed as the cam Q so that when the foot 42 for the mercury switch R nears the high point Q2 of the cam in Figure 6, the roller 18 on the lever L nears the intermediate arcuate portion K3, see Figure 4. Figure 7 shows how the roller 18 will swing the lever L counter-clockwise about the shaft 19 as the roller reaches the intermediate arcuate portion K3 of the cam. The basket J will be lifted above the level of the liquid 24, but will still be positioned within the jar. The basket J is raised by the frame C which in turn is raised by the lever L and the roller 18 riding on to the intermediate arcuate portion K3. As the basket J is lifted out of the fluid, the foot 42 for the mercury switch R will ride on the high point Q2 of the cam and will stop the motor M from rotating.

The raising of the basket-carrying frame C will move the arm 31 above the reciprocating rod 32, so that the rod will no longer act on the arm 31 to reverse the rotation of the basket J. After the basket J reaches its spin-off position within the jar, as shown in Figure 7, the high point Q2 will have passed the foot 42 and now the foot will ride on the low point Q4. The motor circuit will be closed and the motor M will rotate the basket in only one direction because the arm 31 is now suspended above the top of the reciprocating rod 32, and will not be acted upon even though the rod 32 continues to reciprocate.

The cam K continues to rotate and finally the roller 18 is moved from the arcuate portion K3 up to the first portion K1 and this will lift the basket out of the jar. The motor M will again stop because the foot 42 will now travel on the high point Q1 of the cam. This completes the cycle of washing and dry spinning of the basket for any one of the jars.

I will now describe the slight variations of the operating mechanism which takes place when the heating member H is moved between the tubular uprights 1 and 2. In Figures 1, 4, 5 and 7, the heater H is illustrated as including a cylindrical member 46 which takes the place of the jars E, F and G. Within the cylindrical member 46 there is mounted a heating element 47 as shown in Figure 5. Again, in Figures 1, 4 and 7, I have illustrated a supporting rod 48 as rising vertically from the rim of the cylindrical member 46.

After the second rinsing operation in the jar G, the basket-carrying frame C, is lifted to raise the basket J above the top of this rinsing jar. While the basket is suspended in its position above the jar top, the table D is rotated 90° by the mechanism disclosed in my Patent Number 2,645,236, and this will bring the heater H into a position to receive the basket when the latter is lowered. The basket is not rotated during the turning of the turntable. The supporting rod 48 which projects above the cylinder 46 will be positioned directly under the lower cross bar 7 of the frame C, and then when the cam K permits the basket J to move downwardly, the lower cross bar 7 will come into contact with the top of the supporting rod 48 as clearly shown in Figure 8 and will be supported thereby. The length of the rod 48 is such as to hold the frame C at an elevation where the arm 31 for the motor M will be positioned above the vertical reciprocating rod 32 and therefore the arm will not be acted upon by the rod. The motor driven cone 26 will frictionally engage with only the lower conical driven member 27 and the basket J will be rotated within the cylinder 46 in only one direction rather than be alternately rotated in opposite directions. The heating element 47 is always in contact with a source of current as soon as the starting switch (not shown) for the machine is closed and the machine is set into operation. The heat radiated from this element will dry the parts carried by the basket as the latter is rotated continuously for a predetermined length of time in a position disposed directly above the heating element.

After the parts have been dried by the heater, the cam K will cause the roller 18 in Figure 7 to move on to the arcuate portion K3 and this will raise the basket to the spin-off position. The cam K will then raise the roller 18 on to the arcuate portion K1 and this will lift the basket to its highest position as shown in Figure 1. The cycle of the washing, double rinsing and drying is now completed and the machine will shut itself off automatically by the mechanism illustrated in my patent.

From the foregoing description of the various parts of the device, the operation thereof may be readily understood.

The operation of the various parts of the machine have been set forth during the description of the machine, and therefore a brief statement of the complete operation of the machine will suffice. At the start, the washing jar E is positioned between the tubular uprights 1 and 2. The motor B is connected to a source of current by a switch, not shown, and this switch will also connect the heating element 47 to the source of current. The motor B will cause the cam K to rotate through a complete circle of 360°, and during this movement the basket J will be lowered into the fluid 24 in the jar E for washing the parts in the basket. The vertical reciprocating rod 32 will cause the arm 31 or the motor M to alternately rotate the basket J in opposite directions. The cam Q shown in Figure 6 will control the automatic connection of the motor M with the source of current and its disconnection therefrom in the manner already described.

After the basket J has been alternately rotated in opposite directions in the fluid 24 for a predetermined number of times, the cam K will lift the basket into the spin-off position within the jar as shown in Figure 7. During the lifting of the basket from the washing to the spin-off position, the motor M will be disconnected from its source of current due to the foot 42 of the mercury tube R shown in Figure 6 riding over the high point Q2 of the cam. The basket will not be rotated as it is lifted out of the fluid. When the basket reaches the spin-off position within the jar E, the cam Q will have rotated so that the foot 42 of the switch R can drop into the low portion Q4 of the cam and therefore the switch will close the circuit to the motor M. The basket J will be rotated in only one direction during the spin-off position because the arm 31 for the motor M will be supported above the top of the vertical reciprocating rod 32 and will not be contacted thereby.

At the completion of the spin-off, the cam K will lift the basket to the position shown in Figure 1 and then the turntable D will be rotated through an arc of 90° to bring the first rinse jar F into a position between the two tubular uprights 1 and 2. The motor M is disconnected from its source of current during the lifting of the basket J to a point above the jar and during the rotation of the turntable D and therefore the basket J will not be rotated.

The same operation is repeated by the basket J within the first rinse jar F. When the operation is finished for the first rinse jar F, the basket J will be raised out of the jar and then the turntable D will be rotated through another arc of 90° to bring the second rinse jar G into a position to receive the basket.

The same operation for the basket J is carried out in the second rinse jar G and when this is completed the basket will be raised clear of the top of the jar so that the turntable D can be turned another 90° to bring the heater H into a position between the tubular uprights 1 and 2. Again the basket will go through the same operation except that in this instance the supporting rod 48 will hold the frame C at an elevation where the arm 31 for the motor M will be spaced above the top of the vertical reciprocating rod 32 as clearly shown in Figure 8. The basket will therefore be rotated continuously in one direction in the cylinder 46. When the heating of the parts for drying is finished, the basket will be raised to its spin-off position and then finally raised to the point shown in Figure 1 where the machine will come to rest. The parts which have been cleaned, double rinsed and dried, can now be removed from the basket. In my patent the starting switch is automatically opened when the drying operation is completed. The same is true in the present case although the starting switch is not shown.

I claim:

1. In a device of the type described: means for supporting a partially-filled liquid-holding container; a basket-carrying frame projecting over the container and guided for up and down movement; a vertical shaft carried by and movable vertically with the frame; a basket removably secured to the lower end of the shaft for holding the parts to be cleaned; a swingable lever operatively connected to the frame for raising and lowering it and the basket when the lever is moved in a corresponding direction; a cam-following roller mounted on the lever; a rotatable cam provided with a continuous surface over which the roller is movable when the cam is rotated; this cam surface having a first portion spaced from the axis of rotation of the cam at a distance to elevate the basket above the top of the container; this cam portion being followed by a second cam portion designed for lowering the basket until the parts to be cleaned are submerged in the liquid; and means operative on the shaft when the basket is in the liquid and the roller travels on the second cam portion for alternately rotating the shaft first in one direction and then in the other direction for cleaning the parts in the basket; said cam surface having a third cam portion designed to raise the frame to elevate the basket above the liquid level while still retaining the basket within the upper part of the container; whereby the basket will be rotated for driving off any liquid adhering to the parts in the basket.

2. The combination as set forth in claim 1; and in which the shaft rotating means will rotate the shaft and basket in one direction while the cam-following roller is riding on said third cam portion.

3. In a machine for cleaning watch parts or the like: a container having a liquid therein; a vertically-disposed rotatable shaft having a basket at its lower end for holding the parts to be immersed in the liquid in the container; a vertically movable frame for supporting the shaft and basket; motor-actuated means for supporting the frame and permitting the frame to lower the basket for submerging the parts in the liquid for a period of time, thereafter raising the frame to raise the basket above the liquid level for a second period of time with the basket still remaining in the container, and finally raising the frame still higher for lifting the basket above the top of the container; and a second motor operated means carried by the frame for rotating the shaft and basket; said second-named motor operated means including means for alternately rotating the shaft and basket first in one direction and then in the other while the parts are immersed in the liquid; said means for alternately rotating the basket in opposite directions when the basket is immersed, causing the basket to rotate in only one direction when said first motor-actuated means lifts the frame for raising the basket above the liquid level with the basket remaining in the container; whereby any liquid adhering to the parts will be driven off by centrifugal force; the second motor operated means being stopped when said first motor-actuated means lifts the frame for raising the basket out of the container; whereby the basket will stop rotating when lifted clear of the container.

4. In a machine for cleaning watch parts or the like: a turntable; a container having a liquid therein and mounted on the turntable; a rotatably mounted basket for holding the parts to be cleaned; motor-actuated means for lowering the basket to submerge the parts in the liquid, thereafter raising the basket into a position above the liquid level with the basket still in the container, and finally raising the basket into a position above the top of the container; means for rotating the basket while the parts are submerged in the liquid; said basket rotating means including means for rotating the basket in opposite directions and consisting of a motor driven cone; a basket-carrying shaft having two cones therein straddling the first-mentioned cone; the motor driven cone normally engaging with one of the second mentioned cones for rotating the basket in one direction; means for alternately moving the motor driven cone from engagement with one of the second mentioned cones into engagement with the other cone so that the basket will be rotated in opposite directions; said last-named means being brought into operation when the parts are submerged in the liquid, whereby the basket will be rotated in opposite directions; said means for rotating the basket in opposite directions becoming inactive when the basket is raised above the liquid, whereby the basket will be rotated in only one direction; a heating container mounted on the turntable; said heating container adapted to be brought into position to receive the basket when the basket is raised above the top of the liquid-holding container and the turntable rotated for positioning the heating container under the basket; said first-mentioned motor actuating means lowering the basket into the heating container; and means carried by the heating container for making inactive the means for rotating the basket in opposite directions; whereby the basket will be rotated in only one direction when the basket is in the heating container.

References Cited in the file of this patent

UNITED STATES PATENTS

| Number | Name | Date |
|---|---|---|
| 2,184,020 | Repasy | Dec. 19, 1939 |
| 2,195,123 | Pabst | Mar. 26, 1940 |
| 2,277,508 | Bingham | Mar. 24, 1942 |
| 2,341,198 | Weiskopf | Feb. 8, 1944 |
| 2,414,971 | Moser | Jan. 28, 1947 |
| 2,496,506 | Wagner | Feb. 7, 1950 |
| 2,566,819 | Baltsois | Sept. 4, 1951 |
| 2,646,807 | Martin | July 28, 1953 |